(12) United States Patent
Kumar et al.

(10) Patent No.: US 7,096,377 B2
(45) Date of Patent: Aug. 22, 2006

(54) METHOD AND APPARATUS FOR SETTING TIMING PARAMETERS

(75) Inventors: Mohan J. Kumar, Aloha, OR (US); Bassam N. Elkhoury, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/109,127

(22) Filed: Mar. 27, 2002

(65) Prior Publication Data

US 2003/0188083 A1    Oct. 2, 2003

(51) Int. Cl.
*G06F 1/04* (2006.01)

(52) U.S. Cl. ........................ 713/600; 713/500

(58) Field of Classification Search ............ 713/1, 713/2, 500, 503, 600, 501
See application file for complete search history.

(56) References Cited

U.S. PATENT DOCUMENTS

| | | | |
|---|---|---|---|
| 5,097,437 A * | 3/1992 | Larson | 712/245 |
| 5,388,250 A * | 2/1995 | Lewis et al. | 710/58 |
| 5,537,581 A * | 7/1996 | Conary et al. | 713/501 |
| 5,687,371 A * | 11/1997 | Lee et al. | 713/1 |
| 5,774,703 A * | 6/1998 | Weiss et al. | 713/501 |
| 5,935,255 A * | 8/1999 | So et al. | 713/400 |
| 5,944,799 A * | 8/1999 | Smoot et al. | 710/8 |
| 5,964,883 A * | 10/1999 | Hewitt | 713/503 |
| 6,029,223 A * | 2/2000 | Klein | 710/266 |
| 6,047,373 A * | 4/2000 | Hall et al. | 713/1 |
| 6,076,160 A * | 6/2000 | Wisor | 713/1 |
| 6,122,733 A * | 9/2000 | Christeson et al. | 713/2 |
| 6,256,731 B1 * | 7/2001 | Hall et al. | 713/1 |
| 6,351,724 B1 * | 2/2002 | Klassen et al. | 702/186 |
| 6,496,888 B1 * | 12/2002 | Pole, II | 710/110 |
| 6,754,837 B1 * | 6/2004 | Helms | 713/322 |
| 6,763,478 B1 * | 7/2004 | Bui | 713/600 |

* cited by examiner

*Primary Examiner*—Chun Cao
(74) *Attorney, Agent, or Firm*—Ling Hong

(57) ABSTRACT

A method and apparatus for reading a value provided by an electronic device and using that value to derive and set a timing parameter for a bus to which the electronic device is attached.

30 Claims, 3 Drawing Sheets

METHOD AND APPARATUS FOR SETTING TIMING PARAMETERS

FIELD OF THE INVENTION

Method and an apparatus to determine and set a timing parameter for an electronic device coupled to a bus is disclosed.

ART BACKGROUND

In digital electronic systems where components can be substituted with differing components, there is a need to ensure that differing components will function correctly when connected. In many computer systems, there are a number of widely accepted or "standardized" interfaces or busses with widely used or standardized connectors to provide a point where differing components can be connected. Those who manufacture the differing components expect to be able to design their components to connect at that point and have those components work correctly.

Specifically, in the area of so-called "personal" computers, there are a number of standardized interfaces by which such components as a processor are attached to other components, e.g., "socket 7," "slot 1," "socket 370," "slot 2" and "socket 478," just to name a few. Similarly, a number of standardized interfaces exist by which other components, such as I/O cards for personal computers, can be connected, e.g., "ISA," "EISA," "PCI," "AGP" and "PCI-X."

A number of such interfaces have spawned multiple variants where one of the differentiating features is the clock speed at which addresses, data and/or other signals are transferred. By way of example, what is commonly referred to as the "socket 7" interface is available with variations in which the clock speed can be 50, 60, 66, 75 or 100 MHz. Similarly, the "PCI" interface is available in variations with a 25, 30, 33 or 66 MHz clock.

Furthermore, it is common practice to design components that work with such interfaces to use an internal clock with a speed derived from the clock speed of such an interface. Such a derived clock may operate at a fraction of the clock speed of such an interface or may operate at a multiple of the clock speed of such an interface.

Difficulties arise when two components are connected by such an interface where one of the two components is able to function with that interface having a higher clock speed than the other component. It is commonly left to those who assemble such components together to determine the minimum and maximum clock speeds at which the interface of each component can be operated, and to choose a common clock speed that will enable all of the components to work together. It is also commonly left to those who assemble such components together to determine the minimum and maximum clock speed of the internal clock of at least one of the components, and to choose a ratio between the common clock speed chosen for interface and the internal clock speed of that component.

Therefore, the success in assembling such components together depends, to some degree, on those who do the assembly work in determining minimum and maximum clock speeds and in choosing workable clock speeds and ratios of clock speeds. Errors made in determining minimum and maximum clocks speeds or in choosing workable clock speeds and ratios can result in components not working correctly together, and/or components being damaged. A need exists to provide a way to assemble such components that eliminates the opportunity for such errors to be made.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Although numerous details are set forth for purposes of explanation and to provide thorough understanding in the following description, it will be apparent to those skilled in the art that these specific details are not required in order to practice the invention as hereinafter claimed.

A technique for automatically determining timing parameters by reading and using information stored within components attached to a bus is disclosed. Specifically, an embodiment concerns using data stored in a non-volatile memory in a component to determine one or more timing parameters of a bus to which the component is attached and/or of the component, itself. However, although embodiments are discussed in reference to processors coupled to a bus, it is also applicable to other components such as memory and storage devices, as well as I/O interface devices and devices used to bridge between two or more busses.

Figure 1:
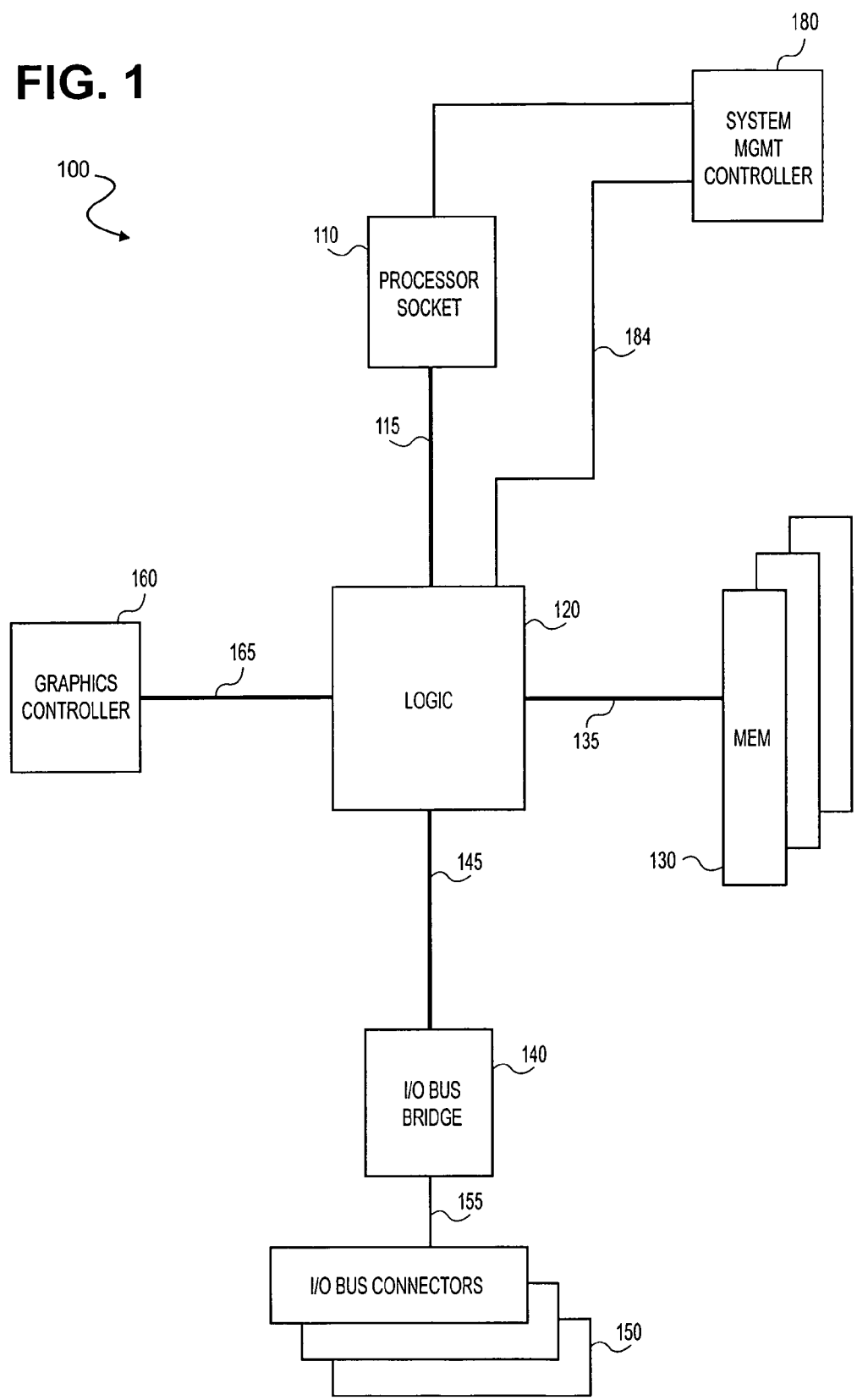
FIG. 1 is a block diagram of one embodiment of a computer system.

FIG. 1 depicts a block diagram of one embodiment in the form of computer system 100. Processor socket 110 is coupled via local bus 115 to logic 120, which in turn, is coupled to memory 130 by bus 135, I/O bus bridge 140 by bus 145, and graphics controller 160 by bus 165. Processor socket 110 may be a connector of any of a number of forms, allowing the attachment of any of a variety of processors. However, in an alternate embodiment, there may not be a processor socket, at all, and in place of processor socket 110, a processor may be directly coupled to bus 115, perhaps by soldering a processor directly to a circuit board carrying the conductors making up bus 115. I/O bus bridge 140 is further coupled to I/O connectors 150, which provide a way by which various devices could be added to computer system 100. Graphics controller 160 may provide outputs to one or more displays (not shown).

In one embodiment, logic 120 is comprised of a single integrated circuit having interface circuitry for each of busses 115, 135, 145 and 165, as well as a memory controller for memory 130. In other embodiments, the functions performed by logic 120 may be distributed among multiple integrated circuits. In still other embodiments, the functions of graphics controller 160 and/or I/O bus bridge 140 may be incorporated within one or more integrated circuits comprising logic 120.

System management controller 180 may be used to monitor the functionality of one or more of the other components of computer system 100, and is coupled to processor socket 110 and logic 120 via busses 182 and 184, respectively. In one embodiment, busses 182 and 184 are 2-wire serial busses with signaling and/or protocol supporting the use of devices designed for the widely used I2C bus. In other embodiments, busses 182 and 184 may be configured as any of a number of varieties of busses. Also, although busses 182 and 184 are depicted as separate busses, in other embodiments, busses 182 and 184 may be one and the same bus.

At a predetermined time, such as when computer system 100 is powered on, reset and/or initialized, system management controller 180 controls logic 120 via bus 184, causing logic 120 to hold the processor installed at processor socket 110 via bus 115 in a reset or other state such that the processor does not perform transactions on bus 115. The holding of the processor in such a state by way of logic 120 could be accomplished by causing logic 120 to signal the processor using one or more control lines provided by bus 115. Alternatively, the processor may execute a series of instructions that causes it to wait or halt, or to in some other way coordinate with system management controller 180 at the predetermined time such that the processor refrains from engaging in transactions on bus 115. As an alternative to using logic 120, system management controller 180 might directly control the processor installed at processor socket 110 via bus 182 to prevent the processor from performing transactions on bus 115. Again, this could be accomplished using a control line provided by bus 182, or by the processor executing code causing the processor to coordinate with system management controller 180.

Either while the processor is being held in such a state or at an earlier time, system management controller 180 uses bus 182 to query the processor for minimum and/or maximum limits regarding one or more timing parameters for the processor's interface to bus 115 and/or for one or more internal timing parameters of the processor, itself. System management controller 180 may also use bus 184 to query logic 120 for similar parameters regarding logic 120 or its interface to bus 115. System management controller 180 uses one or more of these parameters to calculate a parameter value at which bus 115, the processor and/or logic 120 could be set that would enable the processor and logic 120 to work together through bus 115.

A timing parameter that could be queried by system management controller 180 may be the minimum or maximum clock speed of the interface of the processor to bus 115. This parameter could be used to determine what clock speed at which to set bus 115, if similar parameter(s) were already known or could be safely assumed for logic 120. Alternatively, system management controller 180 may use bus 184 to query for similar parameters concerning the interface of logic 120 to bus 115. Another timing parameter that could be queried may be the minimum or maximum internal clock speed of the processor. As those skilled in the art would understand, the minimum and/or maximum internal clock speed of the processor could be used with the minimum and/or maximum clock speed of the interface of the processor and or logic 120 to bus 115 to calculate a ratio between the two clock speeds. This ratio could then be programmed into the processor so that when the clock speed of bus 115 is set, the processor could use internal clock multiplying logic to derive a correct internal clock speed. Similarly, logic 120 may also have such a ratio that must be set, and this may also have to be taken into account in setting the clock speed of bus 115.

In one embodiment, system management controller 180 may use bus 182 to directly set one or more parameters for the processor connected to processor socket 110, and/or to send a command or signal to cause the processor to resume executing instructions or to reinitialize. In another embodiment, system management controller 180 may use bus 184 to indirectly set one or more parameters for the processor through logic 120, and/or to indirectly send a command or to cause logic 120 to send a signal to cause the processor to resume executing instructions or to reinitialize. Specifically, system management controller 180 may use bus 184 to cause logic 120 to place the processor in a state whereby the processor could be made to accept one or more parameters passed through logic 120 via bus 115. More specifically, in one embodiment, logic 120 would place the processor in a state whereby the processor would accept one or more parameters transmitted by logic 120 using address and/or control signal lines of bus 115.

In setting one or more parameters for logic 120, system management controller may use bus 184 to transmit one or more parameters to logic 120 and/or send a command or signal to cause logic 120 to reinitialize. In setting one or more parameters for bus 115, it may be necessary to send one or more parameters to one or both the processor and logic 120, depending on the design of bus 115.

Figure 2:
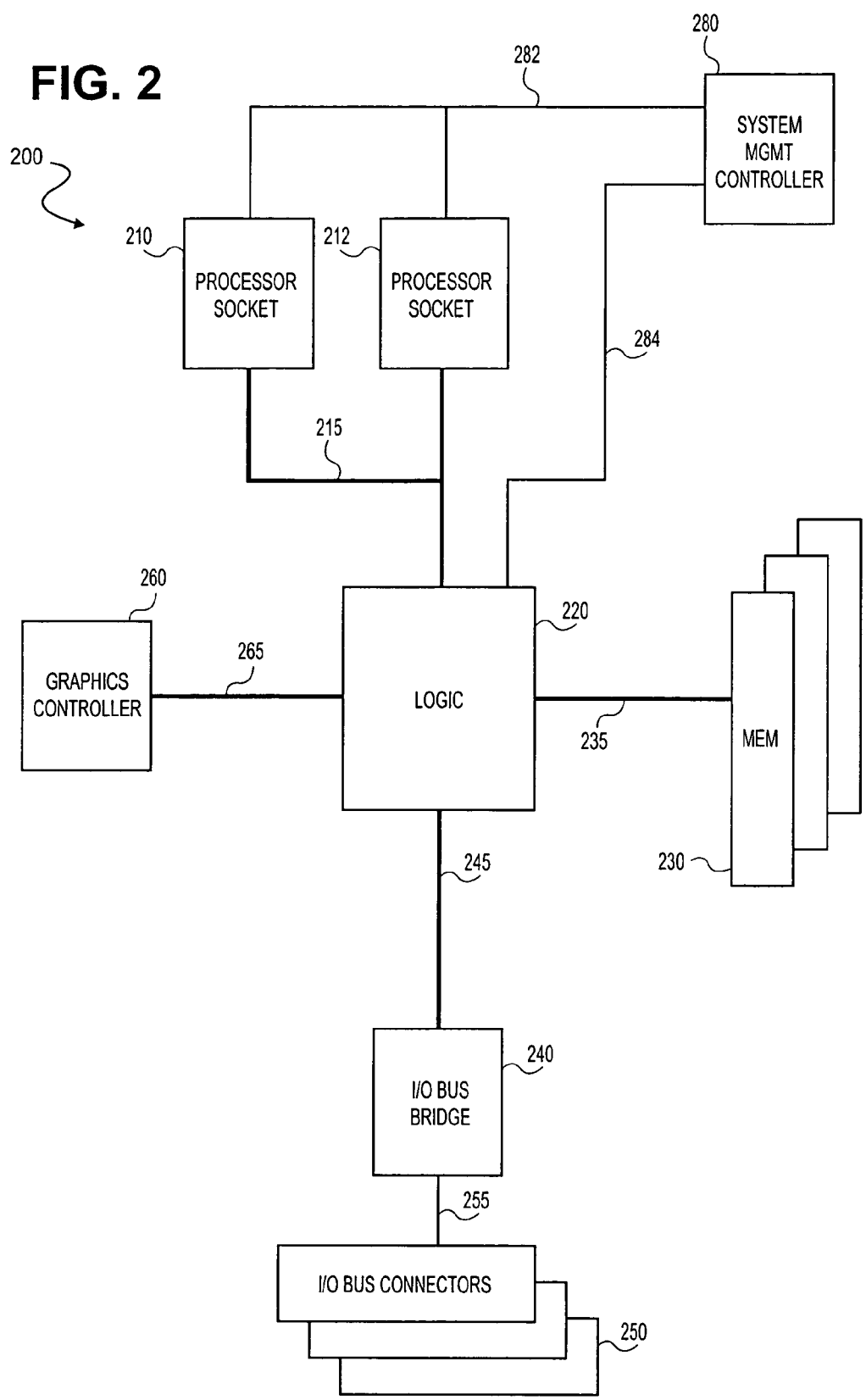
FIG. 2 is a block diagram of another embodiment of a computer system.

FIG. 2 depicts a block diagram of another embodiment in the form of computer system 200. In a manner that generally corresponds to computer system 100 of FIG. 1, processor sockets 210 and 212 are coupled via local bus 215 to logic 220, which in turn, is coupled to memory 230 by bus 235, I/O bus bridge 240 by bus 245, and graphics controller 260 by bus 265. Although processor sockets 210 and 212 are depicted as both sharing substantially the same bus, namely bus 215, in alternate embodiments, processor sockets 210 and 212 may be coupled to logic 220 via substantially separate busses. Processor sockets 210 and 212 may be connectors of any of a number of forms, allowing the attachment of any of a variety of processors. However, in an alternate embodiment, there may not be processor sockets, at all, and the processors may be directly coupled to bus 215, perhaps by soldering processors directly to a circuit board carrying the conductors making up bus 215. I/O bus bridge 240 is further coupled to I/O connectors 250, and graphics controller 260 may provide outputs to one or more displays (not shown).

Although computer system 200 is depicted as having sockets for two processors, computer system 200 may be implemented with three, four or more processors, and these processors may all share a single bus, such as bus 215, or may be distributed among multiple busses. In support of larger numbers of processors, the functions performed by logic 220 may be distributed, and perhaps duplicated, among multiple incarnations of logic 220, especially if the multiple processors are distributed among multiple busses. Furthermore, regardless of the number of processors and/or incarnations of logic 220, computer system 200 may be comprised of multiple incarnations of I/O bus bridge 240.

In a manner corresponding generally to computer system 100 of FIG. 1, logic 220 could be comprised of a single integrated circuit having interface circuitry for each of busses 215, 235, 245 and 265, as well as a memory controller for memory 230, or the functions performed by logic 220 may be distributed among multiple integrated circuits. In still other embodiments, the functions of graphics controller 260 and/or I/O bus bridge 240 may be incorporated within one or more integrated circuits comprising logic 220.

System management controller 280 may be used to monitor the functionality of one or more of the other components of computer system 200, and is coupled to processor sockets 210 and logic 220 via busses 282 and 284, respectively. In one embodiment, busses 282 and 284 are 2-wire serial busses with signaling and/or protocol supporting the use of devices designed for the widely used I2C bus. In other embodiments, busses 282 and 284 may be configured as any of a number of varieties of busses. Also, although busses 282 and 284 are depicted as separate busses, in other embodiments, busses 282 and 284 may be one and the same bus, or bus 282 may be further divided so as to provide a separate bus between system management controller 280 and processor sockets 210 and 212.

Using one of the techniques discussed above with regard to computer system 100 of FIG. 1, at a predetermined time, system management controller 280 causes the processors installed at processor sockets 210 and 212 to refrain from performing transactions on bus 215. System management controller 280 uses bus 282 to query the processors for one or more parameters of the variety previously discussed with regard to computer system 100 of FIG. 1. System management controller 280 may also similarly use bus 284 to query logic 220 for one or more of such parameters for logic 220. System management controller 280 uses one or more of these parameters to calculate a parameter value at which bus 215, the processors and/or the logic 220 could be set that would enable the processors and logic 220 to work together through bus 215. System management controller 280 would then set either the processor or logic 220 with the calculated parameters using one of the techniques previously discussed with regard to computer system 100 of FIG. 1.

Furthermore, system management controller 280 may also use at least one parameter obtained in response to such a query via bus 282 to determine whether or not one or more characteristics of the processors installed processor sockets 210 and 212 would allow both processors to be used, together. It may be that differences in a timing parameter or other characteristic, such as instruction capabilities, cache sizes or revision levels may make it impossible or at least undesirable in some way to use both processors. Should such a situation prove to be the case, system management controller 280 may use either logic 220 via bus 284, or bus 282 to cause one or the other of the L processors to be either partially or completely disabled.

Figure 3:
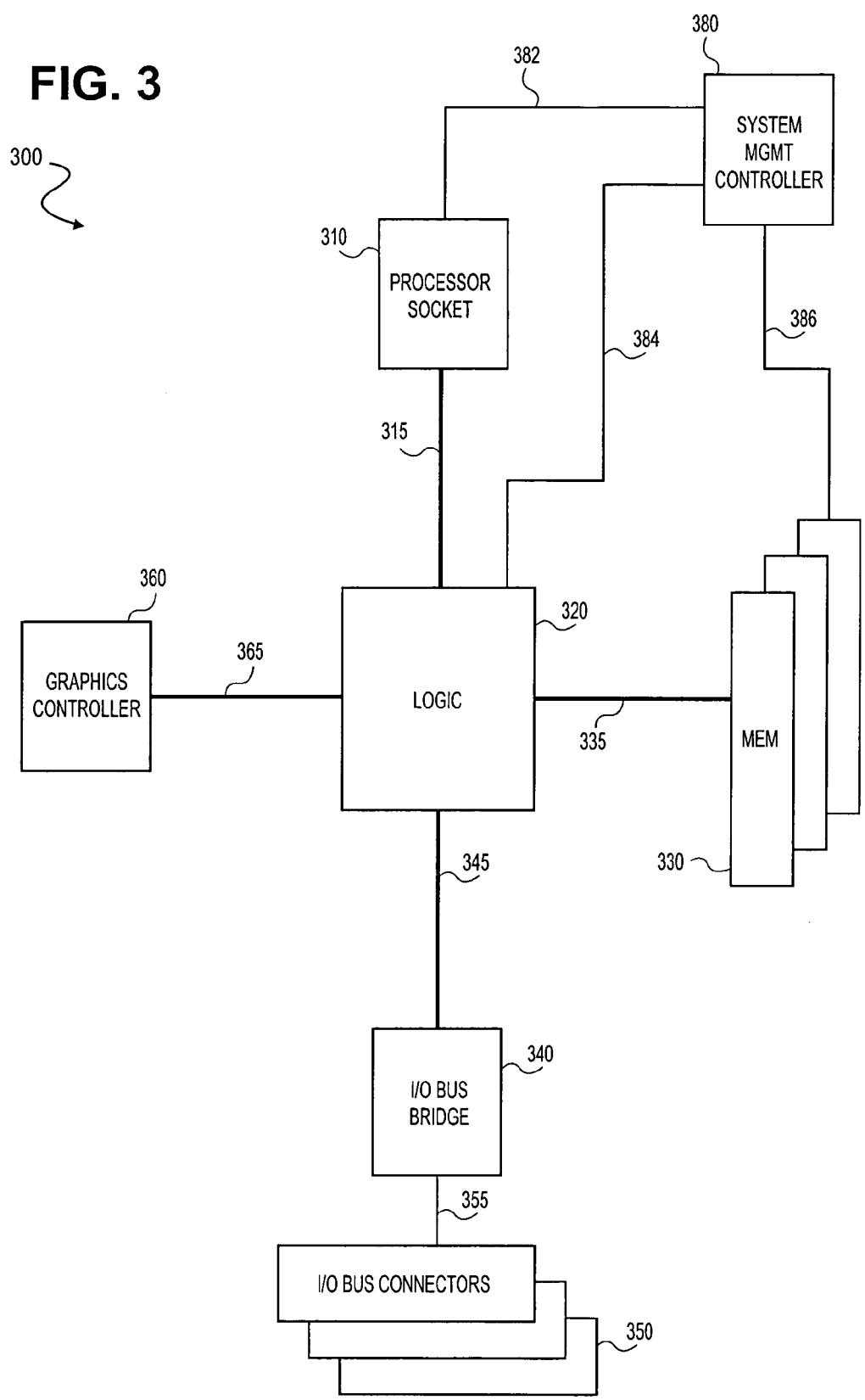
FIG. 3 is a block diagram of still another embodiment of a computer system.

FIG. 3 depicts a block diagram of still another embodiment in the form of computer system 300. In a manner that generally corresponds to computer system 100 of FIG. 1, processor socket 310 is coupled via local bus 315 to logic 320, which in turn, is coupled to memory 330 by bus 335, I/O bus bridge 340 by bus 345, and graphics controller 360 by bus 365. Processor socket 310 may be a connector of any of a number of forms, allowing the attachment of any of a variety of processors. However, in an alternate embodiment, there may not be a processor socket, at all, and a processor may be directly coupled to bus 315, perhaps by soldering a processor directly to a circuit board carrying the conductors making up bus 315. I/O bus bridge 340 is further coupled to I/O connectors 350, and graphics controller 360 may provide outputs to one or more displays (not shown). Logic 320 could be comprised of a single integrated circuit or multiple integrated circuits, and may incorporate other functions such as those of graphics controller 260 and/or I/O bus bridge 240.

System management controller 380 may be used to monitor the functionality of one or more of the other components of computer system 300, and is coupled to processor socket 310, logic 320 and memory 330 via busses 382, 384 and 386, respectively. Busses 382, 384 and 386 may be of any of a number of types of busses, including 2-wire serial busses with signaling and/or protocol supporting the use of devices designed for the widely used I2C bus. Also, although busses 382, 384 and 286 are depicted as separate busses, in other embodiments, two or more of these busses may combined so as to be one and the same bus.

Using one of the techniques discussed above with regard to computer system 100 of FIG. 1, at a predetermined time, system management controller 380 causes the processor installed at processor socket 310 to refrain from performing transactions on bus 315. System management controller 380 may use bus 382 to query the processor attached to socket 310 for one or more parameters of the variety previously discussed with regard to computer system 100 of FIG. 1. System management controller 380 may also similarly use busses 384 or 386 to query logic 320 or memory 330, respectively, for one or more similar parameters. System management controller 380 uses one or more of these parameters to calculate a parameter value at which bus 315, bus 335, the processor, logic 320 and/or memory 330 could be set that would enable the processors, logic 320 and/or memory 330 to work together. System management controller 380 would then set either the processor or logic 320 with the calculated parameters as previously discussed with regard to computer system 100 of FIG. 1.

Specifically, memory 330 may be installed in sockets provided by computer system 300, in a manner not unlike socket 310 being provided for a processor. Individual components, such as SIMM or DIMM modules, or the integrated circuits comprising memory 330 may capable of providing one or more timing parameters upon being queried by system management controller 380 through bus 386. Such parameters may include the maximum clock speed that memory 330 can support on bus 335, latencies for column and/or row address strobes, read and/or write data latch timings, etc. Such parameters provided via bus 386 could be used to set a memory controller within logic 320 with one more parameters calculated to achieve enhanced, or even optimal performance in accessing memory 330. Alternatively, such parameters provided via bus 386 could be used in conjunction with parameters provided via busses 382 and/or 384 to set both busses 315 and 335 with timings that allow busses 315 and 335 to be synchronized. Although not shown in FIG. 3, similar optimizations of buses 345 and/or 365, or the components attached to those busses, could also be carried out, possibly with the provision of additional busses between system management controller 380 and either or both of I/O bus bridge 340 or graphics controller 360.

In the embodiments depicted in FIGS. 1, 2 and 3, the values for the minimum and/or maximum limits queried from the processor may be stored within the processor in a non-volatile random access memory (NVRAM) device incorporated within the processor circuitry based on any of a variety of widely known technologies such as ROM, EPROM, EEPROM, UV-EPROM, flash, etc. In other embodiments, these values may be set using selectively installed resistors and/or selectively created or "blown" connections using any of a variety of widely known techniques. In such embodiments, values provide in response to queries would reflect the presence or absence of resistors and/or created or blown connections. In specific embodiments, these values are stored in a flash memory device readable via busses 182, 282 and 382 in the cases of FIGS. 1, 2 and 3, respectively, using the widely known I2C serial interface protocol.

Also, in the embodiments depicted in FIGS. 1, 2 and 3, the minimum and/or maximum limits queried from the processor, as well as from other types of components in other possible embodiments, may be actual limits of their respective components, or limits specified to meet one or more criterion. Specifically, the manufacturer of a component may set limits that are meant to be more conservative than the actual limits in order to take into account variability in the manufacturing of such a component. Alternatively, the manufacturer of a system of which a component is a part may set limits for that component that are based on limits known or desired to be maintained for some other part of the system. As still another alternative, the manufacturer, supplier or other provider of a component may set arbitrary limits.

Furthermore, in the embodiments depicted in FIGS. 1, 2 and 3, system management controllers 180, 280 and 380, respectively, are depicted as being separate components from logic 120, 220 and 320, respectively. Specifically, system management controllers 180, 280 and 380 may be implemented as separate processing elements with independent memory and I/O capability, i.e., implemented as microcontrollers that function substantially independently of other components of computer systems 100, 200 and/or 300, respectively, including the processors. Specifically, system management controllers 180, 280 and/or 380 may be implemented such that when they are initialized and/or powered on or off may be entirely independent of the processor or processors of computer systems 100, 200 and/or 300. Furthermore, system management controllers 180, 280 and/or 380 may be provided with power sources that are partially or entirely independent of the power sources used to supply power to other components of computer systems 100, 200 and/or 300. Despite their independent function, those skilled in the art will appreciate that such microcontrollers may be physically embedded or otherwise incorporated within at least part of the same semiconductor material comprising the one or more integrated circuits of logic 120, 220 and/or 320. Similarly, such microcontrollers could be physically embedded or other incorporated within at least part of the same semiconductor material comprising one or more of the processors of computer systems 100, 200 and/or 300. Alternatively, the functions described herein as being carried out by system management controllers 180, 280 and 380, may be at least partially performed by at least part of the processors of computer systems 100, 200 and/or 300. In support of this, such processors may incorporate RAM independent of RAM 130, 230 and/or 330 of computer systems 100, 200 and 300, respectively, enabling such processors to carry out the aforedescribed queries and selection of one or more timing parameters.

The invention has been described in conjunction with the preferred embodiment. It is evident that numerous alternatives, modifications, variations and uses will be apparent to those skilled in the art in light of the foregoing description. It will be understood by those skilled in the art that the invention as hereinafter claimed may be practiced in support of setting timings of various components of an electronic system including, but not limited to computer systems. Finally, although embodiments have been depicted where internal components forming the core of a typical computer system are queried for timing parameters, it will be appreciated by those skilled in the art that other devices not forming the core of a typical computer system, such as I/O devices attached to an I/O bus, may also be designed to provide one or more timing parameters that allow the I/O bus and/or the I/O devices, themselves, to be set with parameters that enable the I/O devices to work together and/or with other components through such an I/O bus.

What is claimed is:

1. A computer system comprising:
a first electronic component;
a second electronic component;
a main bus coupling the first and second electronic components; and
a controller coupled to the first electronic component by way of a first control bus to read a first timing value relating to a timing of the main bus, and coupled to the second electronic component by way of a second control bus to derive and set a clock speed of the main bus.

2. The computer system of claim 1, wherein the controller reads the first timing value relating to the timing of the main bus from the first electronic component by way of the first control bus, derives a timing parameter for the main bus by using the first timing value, places the first electronic component in a state wherein the first electronic component refrains from carrying out any transactions on the main bus, and sets the clock speed for the main bus by writing the timing parameter for the main bus to the second electronic component by way of the second control bus.

3. The computer system of claim 2, wherein:
the first electronic component is a processor;
the first timing value relating to the timing of the main bus is a maximum internal clock speed of the processor;
the timing parameter for the main bus is a ratio of an internal clock speed of the processor to the clock speed of the main bus derived from the first timing value and a second timing value representing a predetermined maximum clock speed for the main bus; and
the second electronic component sets the ratio within the processor by writing a value representing the ratio into a register of the processor after placing the processor in a state wherein the processor refrains from carrying out any transactions on the main bus.

4. The computer system of claim 2, wherein:
the first electronic component is a processor;
the first timing value relating to the timing of the main bus is a maximum clock speed of the main bus that the processor can support; and
the timing parameter for the main bus is the clock speed of the main bus.

5. The computer system of claim 2, wherein the controller reads a second timing value relating to the timing of the main bus from the second electronic component by way of the second control bus, and the second timing value is also used to derive the timing parameter.

6. The computer system of claim 5, wherein:
the first electronic component is a processor;
the first timing value relating to the timing of the main bus is a maximum internal clock speed of the processor;
the second timing value relating to the timing of the main bus is a maximum clock speed of the main bus that the second electronic component can support;
the timing parameter for the main bus is a ratio of an internal clock speed of the processor to the clock speed of the main bus derived from the first and second timing values; and
the second electronic component sets the ratio within the processor after placing the processor in a state wherein the processor refrains from carrying out any transactions on the main bus.

7. The computer system of claim 2, further comprising a third electronic component coupled to the main bus, and a third control bus coupling the third electronic component to the controller to enable reading of a second timing value relating to the timing of the main bus which is also used to derive the timing parameter.

8. The computer system of claim 7, wherein:
the first electronic component is a first processor;
the first timing value relating to the timing of the main bus is a maximum clock speed of the main bus that the first processor can support;
the third electronic component is a second processor;

the second timing value relating to the timing of the main bus is a maximum clock speed of the main bus that the second processor can support; and the timing parameter for the main bus is the clock speed of the main bus.

9. The computer system of claim 8, wherein the maximum clock speed of the main bus that the second electronic component can support is also used to derive the clock speed of the main bus.

10. The computer system of claim 2, wherein:

the first electronic component is a memory device;

the second electronic component is a memory controller;

the first timing value relating to the timing of the main bus is a timing limit imposed by the memory device.

11. The computer system of claim 10, wherein the first timing value is a maximum clock speed for the main bus that the memory device can support.

12. The computer system of claim 2, wherein the first electronic component is an I/O device and the timing parameter for the main bus is the clock speed of the main bus.

13. The computer system of claim 12, wherein the first timing value is a maximum clock speed for the bus that the I/O device can support.

14. An apparatus comprising:

a processor;

a logic component;

a processor bus coupling the processor to the logic component; and a controller coupled to the processor by way of a first control bus to read a timing value representing a maximum internal clock speed of the processor from the processor and to derive and set an internal clock speed of the processor based on the timing value.

15. The apparatus of claim 14, wherein the controller reads the timing value representing the maximum internal clock speed of the processor by way of the first control bus, derives a ratio between the internal clock speed of the processor and a clock speed of the processor bus by using the timing value and a predetermined maximum clock speed of the processor bus, and sets the internal clock speed of the processor by writing the ratio to the processor by way of the first control bus.

16. The apparatus of claim 15, further comprising a second control bus coupling the controller to the logic component.

17. The apparatus of claim 16, wherein the controller reads a first timing value representing the maximum internal clock speed of the processor by way of the first control bus, reads a second timing value representing a maximum clock speed of the processor bus by way of the second control bus, derives a ratio between the internal clock speed of the processor and a clock speed of the processor bus by using the first and second timing values, and sets the internal clock speed of the processor by writing the ratio to the processor by way of the first control bus.

18. The apparatus of claim 16, wherein the controller reads a first timing value representing the maximum internal clock speed of the processor by way of the first control bus, reads a second timing value representing a maximum clock speed of the processor bus by way of the second control bus, derives a ratio between the internal clock speed of the processor and a clock speed of the processor bus by using the first and second timing values, and sets the internal clock speed of the processor by writing the ratio to the logic component by way of the second control bus, thereby enabling the logic component to write the ratio into the processor by way of the processor bus.

19. The apparatus of claim 16, wherein the controller reads a first timing value representing the maximum internal clock speed of the processor by way of the first control bus, reads a second timing value representing a maximum clock speed of the processor bus by way of the second control bus, derives a clock speed for the processor bus by using the first and second timing values, and sets the clock speed for the processor bus in the logic component by writing the clock speed for the processor bus to the logic component by way of the second control bus.

20. A computer-readable medium containing a sequence of instructions, which when executed by a processor causes the processor to:

read a first timing value relating to the timing of a bus by way of a first control bus from a first electronic device that is coupled to the bus;

derive a timing parameter for the bus using the first timing value;

cause the first electronic device to refrain from carrying out transactions on the bus; and set a clock speed for the bus by writing the timing parameter by way of a second control bus to a second electronic device that is coupled to the bus.

21. The computer-readable medium of claim 20, wherein the processor is further caused to use a second timing value relating to the timing of a bus that is read from the second electronic device to derive the timing parameter for the bus.

22. The computer-readable medium of claim 20, wherein:

the first electronic device is a second processor;

the first timing value is a maximum internal clock speed of the second processor; and the timing parameter is a ratio of internal clock speed of the second processor to the clock speed of the bus.

23. The computer-readable medium of claim 20, wherein:

the first electronic device is a second processor;

the first timing value is a maximum clock speed of the bus that the second processor can support; and the timing parameter is the clock speed to which the bus will be set.

24. The computer-readable medium of claim 20, wherein:

the first electronic device is a memory device;

the first timing value is a maximum clock speed of the bus that the memory device can support; and the timing parameter is the clock speed to which the bus will be set.

25. An apparatus comprising:

a processor;

a logic component coupled to the processor by way of a first control bus to read a timing value representing a maximum internal clock speed of the processor from the processor and to set an internal clock speed of the processor based upon the timing value; and a processor bus coupling the processor to the logic component.

26. The apparatus of claim 25, wherein the logic component reads the timing value representing the maximum internal clock speed of the processor by way of the first control bus, derives a ratio between the internal clock speed of the processor and a clock speed of the processor bus by using the timing value and a predetermined maximum clock speed of the processor bus, and sets the internal clock speed of the processor by writing the ratio to the processor by way of the first control bus.

27. The apparatus of claim 25, wherein the logic component reads the timing value representing the maximum internal clock speed of the processor by way of the first control bus, derives a ratio between the internal clock speed of the processor and a clock speed of the processor bus by using the timing value and a predetermined maximum clock speed of the processor bus, and sets the internal clock speed of the processor by writing the ratio to the processor by way of the processor bus.

28. The computer system of claim 1, wherein
the first electronic component is a memory device;
the second electronic component is a memory controller; and
the controller reads a second timing parameter relating to a minimum latency time for address decoding required by the memory device from the first electronic component, and sets a latency parameter for the main bus by writing to the second electronic component.

29. The computer system of claim 1, wherein
the first electronic component is an I/O device; and
the controller reads a second timing parameter relating to a minimum latency time for address decoding required by the I/O device from the first electronic component, and sets a latency parameter for the main bus by writing to the second electronic component.

30. The computer-readable medium of claim 20, wherein
the first electronic device is a memory device; and
the processor is further caused to read from the first electronic component a second timing parameter relating to a minimum latency time for decoding an addressed from the bus required by the memory device, and set a latency parameter for the bus by writing to the second electronic device.

* * * * *